(12) United States Patent
Schmeinck et al.

(10) Patent No.: US 9,833,805 B2
(45) Date of Patent: Dec. 5, 2017

(54) METHOD FOR OPERATING A SURFACE TREATMENT INSTALLATION, SET OF FILTER MODULES AND SURFACE TREATMENT INSTALLATION

(71) Applicant: Eisenmann SE, Boeblingen (DE)

(72) Inventors: Nils Schmeinck, Stuttgart (DE); Herbert Schulze, Aidlingen (DE); Juergen Roeckle, Magstadt (DE)

(73) Assignee: EISENMANN SE, Boeblingen (DE)

( * ) Notice: Subject to any disclaimer, the term of this patent is extended or adjusted under 35 U.S.C. 154(b) by 51 days.

(21) Appl. No.: 14/774,908

(22) PCT Filed: Mar. 11, 2014

(86) PCT No.: PCT/EP2014/000640
§ 371 (c)(1),
(2) Date: Sep. 11, 2015

(87) PCT Pub. No.: WO2014/139669
PCT Pub. Date: Sep. 18, 2014

(65) Prior Publication Data
US 2016/0023231 A1 Jan. 28, 2016

(30) Foreign Application Priority Data
Mar. 11, 2013 (DE) ........................ 10 2013 004 082

(51) Int. Cl.
*B01D 46/00* (2006.01)
*B05B 15/12* (2006.01)
(Continued)

(52) U.S. Cl.
CPC .......... *B05B 15/1248* (2013.01); *B01D 45/12* (2013.01); *B01D 46/0013* (2013.01);
(Continued)

(58) Field of Classification Search
CPC .............. B01D 46/002; B05B 15/1248; B05B 15/1229; B05B 15/12; B05C 15/00
(Continued)

(56) References Cited

U.S. PATENT DOCUMENTS 4,401,445 A * 8/1983 Browning ............ B01D 46/002
118/326
4,498,913 A * 2/1985 Tank ................... B05B 15/1248
118/DIG. 7

(Continued)

FOREIGN PATENT DOCUMENTS

| DE | 250 865 A1 | 10/1987 |
|---|---|---|
| DE | 299 20 041 U1 | 5/2000 |
| DE | 101 15 376 A1 | 10/2002 |
| DE | 10 2011 108 631 A1 | 1/2013 |
| DE | 10 2011 117 667 A1 | 5/2013 |
| WO | 02/098537 A2 | 12/2002 |

*Primary Examiner* — Duane Smith
*Assistant Examiner* — Minh-Chau Pham

(57) ABSTRACT

In a method for operating a surface treatment installation, overspray produced in a coating booth is taken up by an air stream and carried to one or more one-way filter modules, in which overspray is separated. Once a limit loading with overspray is reached, a one-way filter module is exchanged for an empty one-way filter module. Depending on the nature and characteristics of the overspray, the one or more one-way filter module(s) may be chosen from a set of different one-way filter modules. A set of filter modules for use in a surface treatment installation is provided having various filter modules formed as exchangeable one-way structural units with a module housing and a filter unit. The module housings of the various filter modules have the same-connection module inlets and the same-connection module outlets and at least the filter units of two different filter modules are formed differently.

13 Claims, 10 Drawing Sheets

(51) Int. Cl.
*B01D 45/12* (2006.01)
*B01D 50/00* (2006.01)
*B05B 15/00* (2006.01)
*B01D 45/08* (2006.01)

(52) U.S. Cl.
CPC ....... *B01D 46/0023* (2013.01); *B01D 50/002* (2013.01); *B05B 15/008* (2013.01); *B05B 15/1251* (2013.01); *B01D 45/08* (2013.01); *B01D 2267/40* (2013.01); *Y02P 70/36* (2015.11)

(58) Field of Classification Search
USPC .................. 55/356, 422, 472, 481, DIG. 46; 98/115.2; 118/326, 309, DIG. 7; 454/50, 454/53
See application file for complete search history.

(56) References Cited

U.S. PATENT DOCUMENTS

| | | |
|---|---|---|
| 6,723,169 B2 * | 4/2004 | Hihn .................. B05B 15/1229 118/309 |
| 6,833,022 B2 | 12/2004 | Feisthammel et al. |
| 6,946,032 B2 | 9/2005 | Pohl et al. |
| 7,399,362 B2 | 7/2008 | Pohl et al. |
| 2003/0136338 A1 | 7/2003 | Pohl et al. |
| 2004/0107834 A1 | 6/2004 | Feisthammel et al. |
| 2005/0247263 A1 | 11/2005 | Pohl et al. |
| 2014/0202332 A1 | 7/2014 | Link et al. |
| 2014/0366798 A1 | 12/2014 | Katefidis et al. |

* cited by examiner

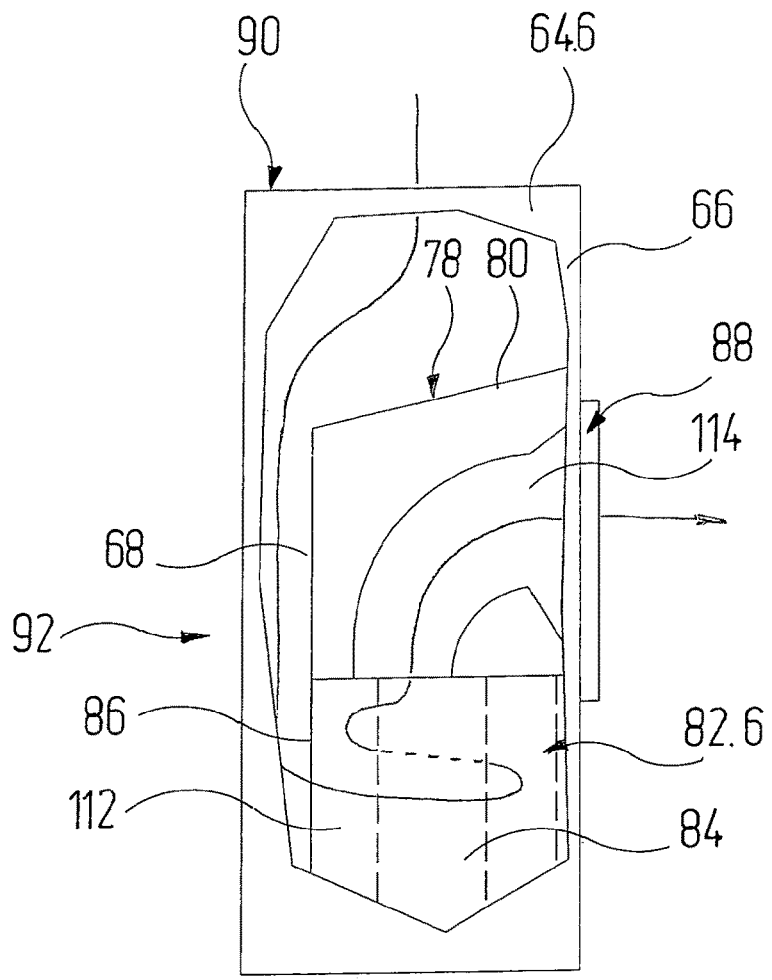
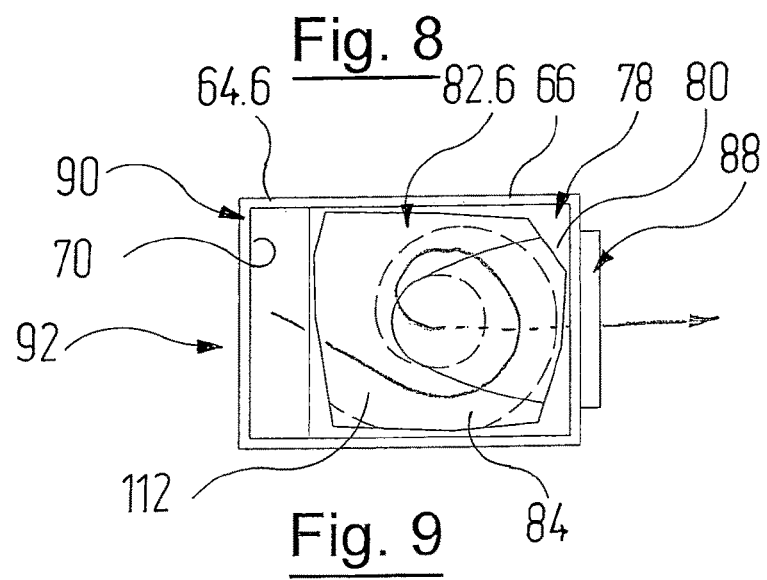

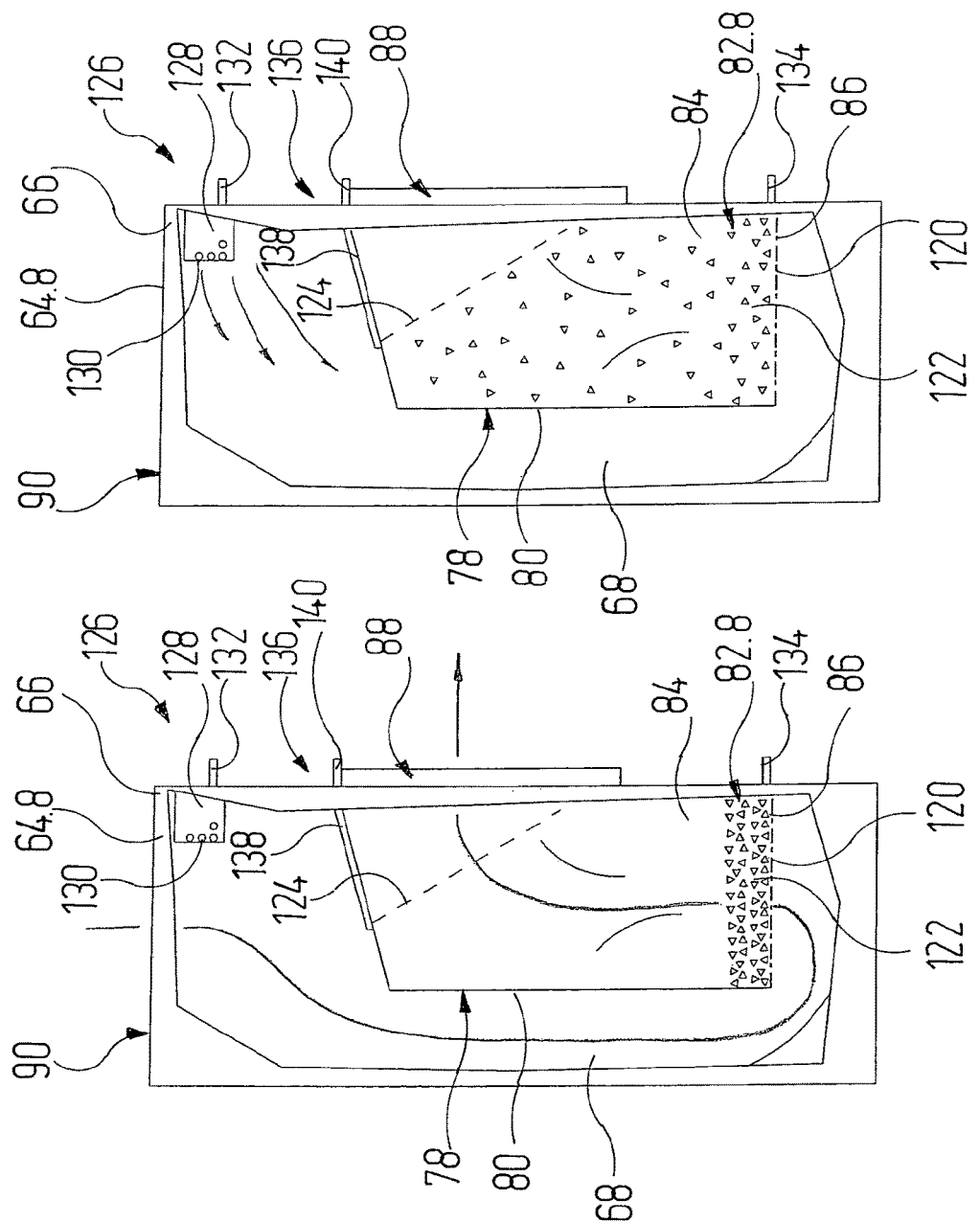

US 9,833,805 B2

METHOD FOR OPERATING A SURFACE TREATMENT INSTALLATION, SET OF FILTER MODULES AND SURFACE TREATMENT INSTALLATION

RELATED APPLICATIONS

This application is a national phase of International Patent Application No. PCT/EP2014/000640, filed Mar. 11, 2014, which claims the filing benefit of German Patent Application No. 10 2013 004 082.5, filed Mar. 11, 2013, the contents of both of which are incorporated herein by reference.

FIELD OF THE INVENTION

The invention relates to a method for operating a surface treatment installation, in which overspray that is produced in a coating booth is taken up by an air stream and carried to one or more one-way filter modules, in which overspray is separated, wherein, once a limit loading with overspray is reached, a one-way filter module is exchanged for an empty one-way filter module.

The invention also relates to a set of filter modules and an installation for the surface treatment of objects, in particular vehicle bodies, with a) a coating booth, through which an air stream can be conducted, which takes up any overspray produced and carries it away;
b) a separation device, to which this air stream can be supplied and where a majority at least of the solids is separated from the overspray.

BACKGROUND OF THE INVENTION

In the manual or automatic application of paints to objects, a partial flow of the paint, which generally contains both solids and/or binding agents and solvents, is not applied to the object: This partial flow is termed "overspray" among experts.

Furthermore, the terms overspray, overspray particles or overspray solids are always understood in the sense of a disperse system, such as an emulsion or suspension or a combination of these. The overspray is captured by the air stream in the spray booth and supplied to a separation facility, so that the air can be returned, if applicable following suitable conditioning, to the coating booth again.

In installations with a greater paint consumption in particular, for example in installations for painting vehicle bodies, wet separation systems on the one hand or electrostatically operating dry separators on the other hand are preferably used in a known manner. In known wet separators a relatively large amount of energy is required to circulate the very large quantities of water required. The processing of the flushing water is cost-intensive due to the high use of chemicals that bind and detackify the paint and due to the paint sludge disposal. Furthermore, due to the intensive contact with the flushing water, the air takes up a lot of moisture, resulting in turn in a high energy consumption to process the air in recirculating air mode. In electrostatically operating dry separators the paint overspray must be removed continuously from the separating surfaces, which is usually associated with very elaborate structural measures and can accordingly be susceptible to malfunction. In addition, the energy outlay is relatively high in such separators.

As an alternative to these separation systems, it is known from DE 10 2011 108 631 A1, for example, to work with exchangeable one-way filter modules, which on reaching a limit loading with overspray are exchanged for unloaded filter modules and are disposed of or recycled if applicable. The processing and/or disposal of such filter modules can be more compatible in energy terms and also with regard to the required resources than the outlay with a wet separator or an electrostatically operating separation device.

Depending on the nature of the coating material, various types of overspray with different characteristics can be produced in a surface treatment installation and it appears that the filter effect and the absorption capacity of filter modules of the same construction type is different for various overspray types and not always optimal. When painting vehicle bodies, solvent-based paints, water-soluble paints, 2-component and/or multicomponent paints are used, for example, which have various characteristics that are found accordingly in the overspray produced in each case also.

SUMMARY OF THE INVENTION

An object of the invention is to propose a way in which a surface treatment installation of the type stated at the beginning can be operated more effectively in respect of the separation of overspray.

This object may be achieved in a method of the type stated at the beginning in that the one or more one-way filter module(s) is/are selected from a set of different one-way filter modules depending on the nature and characteristics of the overspray.

A set of different one-way filter modules is thus provided in which the different filter modules are optimised respectively with regard to the separation of a certain type of overspray.

Depending on the application process, which is carried out or is to be carried out in the coating booth, the cleaning of the air stream laden with overspray from the coating booth can thus be prepared or optimised.

It is favourable in particular if the rheological characteristics of the overspray, i.e. the flow behaviour of the overspray, and/or the particle size distribution of the overspray are taken into account in the selection of the one-way filter module and a filter module coordinated accordingly to this is selected.

The set of filter modules in question is adapted to use in a surface treatment installation in which overspray that is produced in a coating booth is taken up by an air stream and carried to one or more one-way filter modules, in which overspray is separated, wherein a one-way filter module, on reaching a limit loading with overspray, is exchanged for an empty one-way filter module. According to the invention, the set is formed such that it a) comprises various filter modules, which are formed as exchangeable one-way structural units with a module housing and a filter unit and through which air from the booth that is laden with overspray can be passed; and
b) the module housings of the various filter modules have same-connection module inlets;
c) the module housings of the various filter modules have same-connection module outlets;
d) at least the filter units of two different filter modules are formed differently.

Due to the same-connection module inlets and module outlets, various filter modules can be used in one and the same installation or coating booth without any problem.

Various filter models are hereby compatible with one another and with the coating booth in which they are to be used. The geometries of the module housings of various filter modules in the set or the flow path of the booth air through these can differ sharply in this case.

It is favourable if the set comprises at least one filter module that is formed as a separation filter. Separation filters should be taken to mean filters in which the booth air flows through a filter medium on which overspray is separated, due to which overspray is filtered out of the booth air.

It is also advantageous if the set comprises at least one filter module that is formed as an inertial filter.

For some types of overspray it can be favourable if the set comprises at least one filter module that is formed as a combination filter with an inertial part and a separation part. In this case the characteristics of an inertial filter are thus combined with the characteristics of a separation filter.

A good filter effect can be achieved if the inertial filter and/or the inertial part of a respective filter module is/are formed as a cyclone.

It is also advantageous if the set comprises at least one filter module with a plurality of filter elements, which are arranged in such a way that a flow labyrinth is formed between the filter elements.

The set also preferably comprises at least one filter module in which filter lamellae, filter hollow tubes, filter rods, compartment structures or chamber structures are present as filter elements.

In particular, the filter elements can be formed as filter lamellae with an arcuate or V-shaped cross section.

The set of filter modules can be used particularly effectively if this comprises at least one filter module in which several filter stages are present that follow one another in the flow direction of the booth air.

The object indicated above may be consequently achieved in a surface treatment installation of the type stated at the beginning in that
c) the separation device comprises a set of such filter modules.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Embodiments of the invention are explained in greater detail below with reference to the drawings. In these.

FIG. 8 shows a view in perspective of a filter module with a filter structure of a sixth type;

FIG. 9 shows a view from above of the filter module according to FIG. 8;

FIG. 12 shows a side view of a filter module with a partly broken-away filter housing with a filter structure of an eighth type, in which collected overspray can be treated in the filter module also;

FIG. 13 shows a side view corresponding to FIG. 12 to illustrate the treatment of the overspray.

DETAILED DESCRIPTION OF THE PRESENT INVENTION

Figure 1:
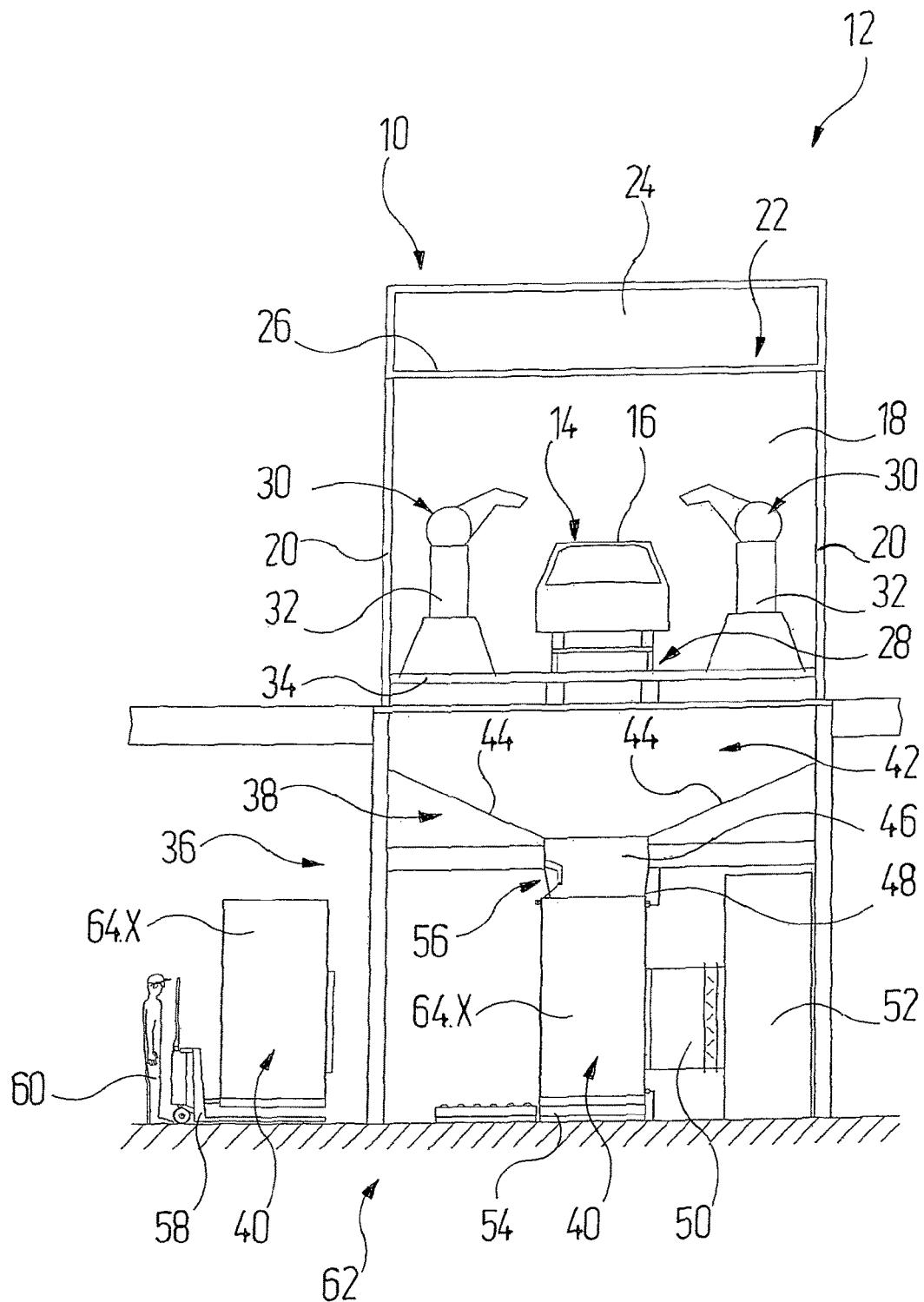
FIG. 1 shows a spray booth with a separation device for overspray according to a first embodiment in a front view, in which booth air is carried via an air guiding facility to filter modules.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

FIG. 1 shows a coating, booth 10 of a surface treatment installation designated as a whole by 12, in which objects 14 are painted. Vehicle bodies 16 are shown as an example of objects 14 to be painted. Before these enter such a coating booth 10, they are e.g. cleaned and degreased in pretreatment stations that are not specifically shown.

The coating booth 10 comprises a coating tunnel 18 arranged at the top, which is delimited by vertical side walls 20 and a horizontal booth ceiling 22, but is open at the ends. Furthermore, the painting tunnel 18 is open towards the bottom in such a manner that booth waste air laden with overspray can flow downwards. The booth ceiling 22 is normally a lower delimitation of an air supply space 24 and is formed as a filter ceiling 26.

The vehicle bodies 16 are transported by a known conveyor system 28, which is fitted in the coating tunnel 18, from the inlet side of the coating tunnel 18 to its outlet side. Located in the interior of the coating tunnel 18 are application devices 30 in the form of multiaxial application robots 32, such as are likewise known in themselves. By means of the application robots 32 the vehicle bodies 16 can be coated with the relevant material.

The coating tunnel 18 is open downwards via a passable grating 34 to an installation area 36 arranged underneath it in which overspray particles carried by the booth air are separated from the booth air.

During the coating process, air flows from the air supply space 24 downwards through the coating tunnel 18 to the installation area 36, wherein the air takes up any paint overspray present in the coating tunnel 18 and carries it with it.

This air laden with overspray is carried with the aid of an air guiding facility 38 to a separation device in the form of one or more one-way filter modules 40, which are described only as filter modules 40 below.

To this end the air guiding facility 38 in the present embodiment comprises a guide channel 42, which is formed by guide plates 44, which extend at an angle inwards and downwards from the side walls 20. The guide channel 36 opens below into several connecting channels 46, which end for their part below in a connecting piece 48.

In operation each filter module 40 is connected aerodynamically and detachably to the air guiding facility 38. The booth air flows in the filter module 40 through a filter unit with a filter structure on which the paint overspray is deposited. This will be looked at again further below. On the whole each filter to module 40 is formed as an exchangeable structural unit.

The booth air, now largely liberated from overspray particles, flows out of the filter modules 40 into an intermediate channel 50, via which it enters a collective flow channel 52. The booth air is supplied via the collective flow channel 52 to a further processing and conditioning and following this is carried in a circuit, which is not specifically shown here, back to the air supply space 24, from which it enters the coating tunnel 18 again from above.

If the booth air is actually not yet adequately liberated from overspray particles by the existing filter modules 40, further filter stages can be placed downstream of the filter modules 40, to which the booth air is supplied and in which electrostatically operating separators, for example, such as are known in themselves, can also be used.

Each filter module 46 rests in its operating position on a balance 54 and is locked in its operating position by means of a locking device 56.

Each filter module 40 is designed to take up a maximum paint quantity, i.e. for a limit loading with overspray, which depends on the type of filter module 40 and the materials used for this. The paint quantity already taken up can be monitored by way of the balance 54. Alternatively, the limit loading can be determined by a differential pressure determination. The greater the loading of the filter module 40, the greater the air resistance built up by the filter module 40.

When a filter module 40 reaches its maximum absorption capacity, the locking device 56 is activated and the fully laden filter module 46 is moved out of the lower installation area 40 of the coating booth 10. This can be done for example with the aid of a lifting truck 58, which is operated by a worker 60. To this end the base area of the filter module 40 can be formed in its geometry and dimensions as a standardised support structure and according to the specification of a so-called europallet, for example.

The flow connection of the filter module 40, which is to be exchanged, to the air guiding facility 38 is closed beforehand by a gate valve, which is not specifically shown. This gate valve diverts the booth air to the filter modules 40 arranged adjacent to the filter module 40 to be exchanged. These then take over its task until the exchange has been carried out.

Then an empty filter module 40, i.e. one not laden with overspray, is moved into the operating position, in which it is connected in a flow-tight manner to the air guiding facility 38, whereupon the locking device 56 is locked again. The gate valve of the air guiding facility 38 is brought into an open position again, so that the booth air flows through the newly positioned filter module 40.

In a modification that is not specifically shown, the exchange of a filter module 40 can also take place in an automated or at least semi-automated manner. Conveying technology known in itself can be present for this purpose ahead of the filter modules 40 arranged adjacent to one another, which can convey the filter modules 40 to be exchanged to one or more removal points, where they can be removed by a worker 60. At one or more loading points an empty filter module 40 can then be transferred to the conveying technology, which conveys this empty filter module 40 then to the location in the installation area 36 where the full filter module 40 has been removed.

As mentioned at the beginning, the type of coating material with which the objects are coated in the coating booth 10 can be different or can change for various objects or in different process sequences or phases. Depending on the coating material applied, however, different types of overspray are produced.

Depending on the nature and the characteristics of the overspray produced, the requirements in respect of filter modules used can also be different, in order to realise an effective filter effect coordinated to the respective type of overspray.

Thus depending on the nature and the characteristics of the overspray produced, a filter module 40 can be required for an effective separation of overspray that is formed, for example, as a separation filter or as an inertial filter or also as a combination of these.

The filter modules 40 are therefore selected, depending on the nature and the characteristics of the overspray, from a set 62 of different one-way filter modules 64.X, wherein X is intended to describe different one-way filter modules of the set 62 as a serial number.

Different filter modules 64.1 to 64.8 are now illustrated with reference to FIGS. 2 to 13. The filter modules 64.X shown there only represent examples of possible variants of different filter modules 64.X for various types of overspray. A set 62 can also comprise alternatively or in addition filter modules 64.X constructed differently or also fewer than the specifically explained filter modules 64.X. In all the filter modules 64.X described below the same reference symbols describe corresponding components and parts.

Figure 2:
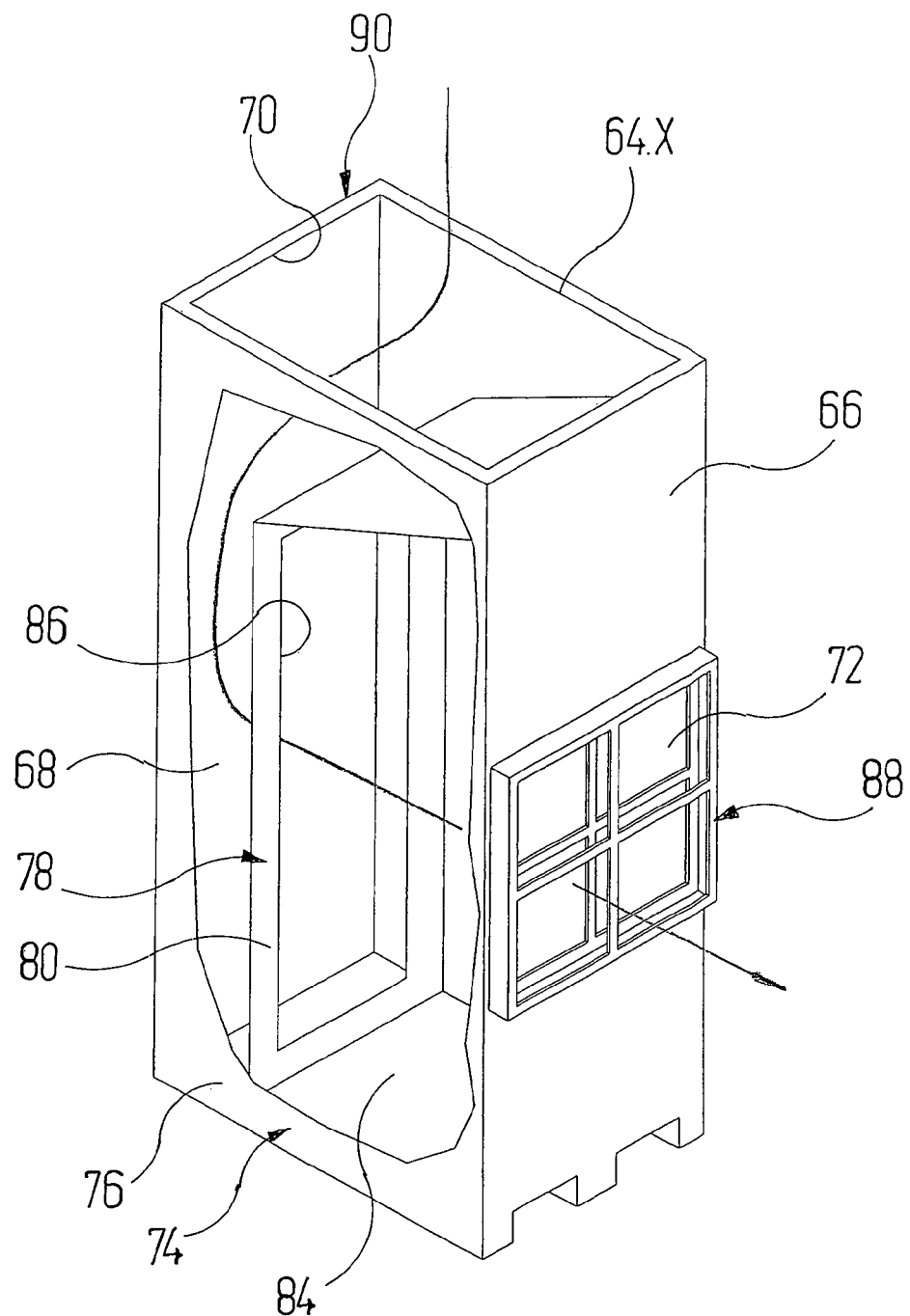
FIG. 2 shows a view in perspective of a module housing of a filter module from a set of filter modules with a module inlet and a module outlet and with a filter unit placed in the module housing, wherein a filter structure of the filter unit is not shown.

In FIG. 2 the basic structure of the filter modules 64.X of the set 62 is first illustrated with reference to a module housing 66, which is the same functionally for various filter modules 64.X. The module housing 66 delimits a flow chamber 68, which extends between a module inlet 70 and a module outlet 72 and through which booth air flows.

The module housing 66 comprises a base part 74, which is formed in its geometry and its dimensions as a standardised support structure in the present embodiment and is formed, for example, according to the specification of a europallet already mentioned above. The arrangement of the filter modules 40 or 64.X in the installation area 36 of the coating booth 10 can take place correspondingly according to a grid, which rests on the standardised base part 74 used.

At least a lower collecting area of the filter module 64.X is liquid-tight and is formed in this way as a collecting trough 76 for coating material, which is precipitated in the filter module 64.X and drains downwards.

Arranged in the flow chamber 68 is a filter unit 78 already touched upon above, which comprises a filter housing 80 for various filter structures 82.X, wherein X is intended again to characterise different filter structures 82.X as a serial number, which filters are used for different types of overspray. Filter structures 82.1 to 82.8, which are different from one another, are to be recognised in FIGS. 3 to 11.

The filter structures 82.X are arranged in a filter space 84, in which the booth air laden with overspray can flow through a flow inlet 86 of the filter housing 80 and which leads to the module outlet 72 of the filter module 64.X.

The module outlet 72 is formed uniformly structurally in the present embodiment for all filter modules 64.X of the set 62 as an outlet connection piece 88, which is formed for a flow-tight connection to the intermediate channel 50 of the coating booth 10. Expressed in general terms, the module housings 66 of the various filter modules 64.X have same-connection module outlets 72.

The module inlet 70 is formed uniformly structurally in the present embodiment for all filter modules 64.X of the set 62 as an inlet connection piece 90, which is formed for a flow-tight connection to the connection piece 48 of the air guiding facility 38. Expressed in general terms, the module housings 66 of the various filter modules 64.X thus have same-connection module inlets 70.

In the filter module 64.X illustrated in FIG. 2, the booth air flows from above into the flow chamber 68 and is carried there around 90° through the flow intake 86 of the filter unit 78, flows through its filter space 84 with the filter structure 82.X and leaves this at the side through the module outlet 72. This is illustrated by an arrow, which has no reference symbol of its own.

Figure 3:
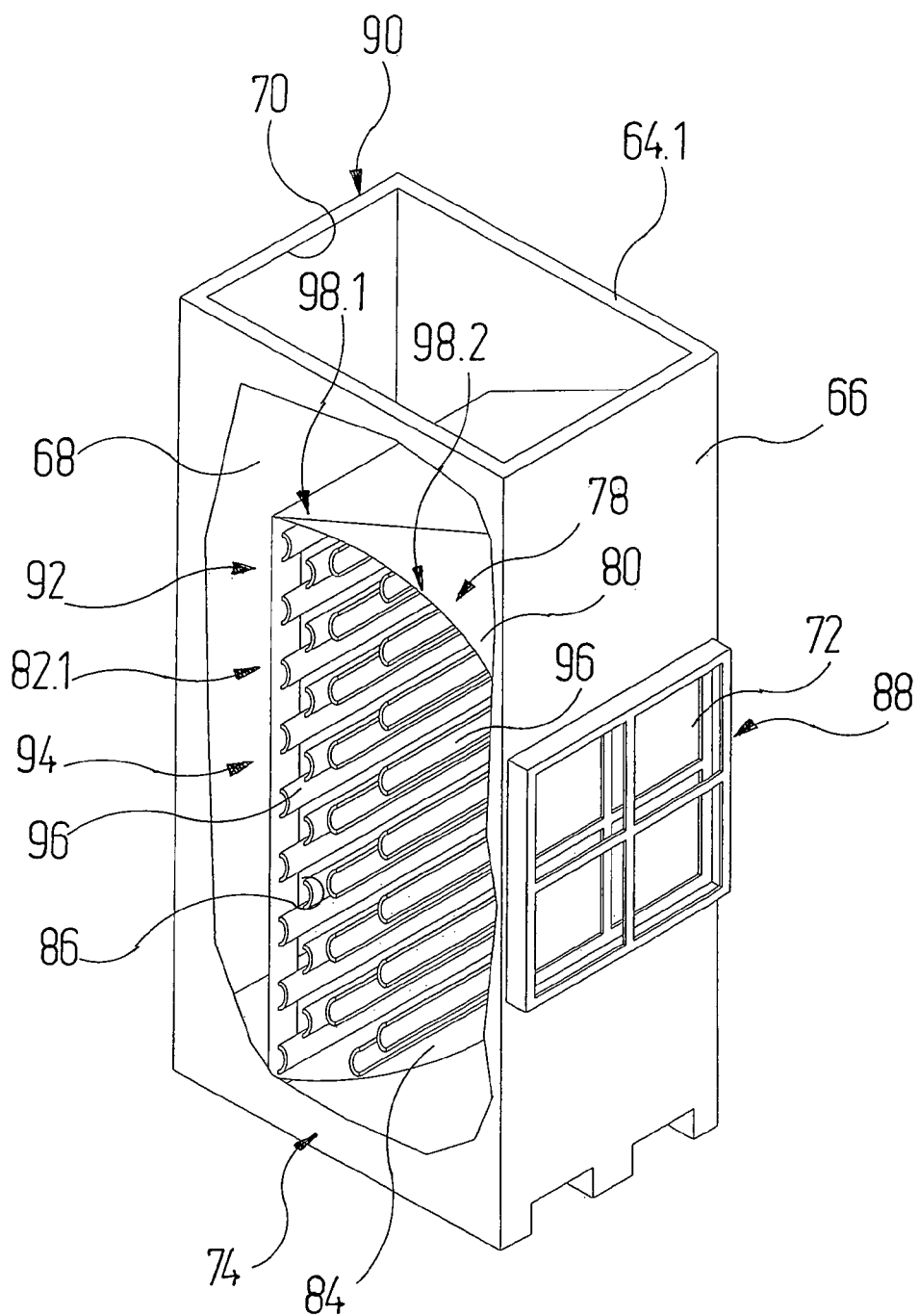
FIG. 3 shows a view in perspective of a filter module with a filter structure of a first type.

FIG. 3 now shows a filter module 64.1 of the set 62 with a filter structure 82.1 of a first type. The filter unit 78 with the filter structure 82.1 is designed as an inertial filter 92 and to this end comprises as filter medium a plurality of filter elements 94 in the form of filter lamellae 96 arranged horizontally and transversely to the flow direction of the booth air, of which lamellae only a few are provided with a reference symbol for the sake of clarity. The filter lamellae 96 can also run downwards with a slight inclination, so that separated overspray can run to and drip downwards from one end of the filter lamellae.

The filter lamellae 96 are curved in cross section in the present embodiments. Other cross sectional shapes such as V-shaped cross sections are likewise possible, however. The filter unit 78 defines filter stages 98.1 and 98.2 arranged consecutively in the flow direction. In the first filter stage 98.1, the filter lamellae 96 are arranged in two vertical planes and offset to one another, wherein the open side of the curve of the filter lamellae 96 points opposite to the flow direction of the booth air, i.e. in the direction lying away from the module outlet 72. In the second filter stage 98.2, the filter lamellae 96 are arranged in several vertical planes consecutively, but not offset to one another. In addition, the open side of the curve of the filter lamellae 96 points there in the flow direction of the booth air, i.e. in the direction of the module outlet 72.

A flow labyrinth is formed in this way in the flow direction in the filter module 64.1, through which labyrinth the booth air flows and in which the overspray particles are deposited on the filter lamellae 96 in a known manner according to the principle of mass inertia. From there the overspray flows downwards into the collecting trough 76, where the overspray accumulates to a paint sump. Expressed in very general terms, therefore, the filter elements 94 are arranged in such a way that a flow labyrinth is formed between the filter elements 94.

Such a labyrinth filter module 64.1 is basically suitable for separating all types of paint such as solvent-based paints, water-soluble paints and 2- or multicomponent paints. It offers a good separation capacity with a relatively large and open flow cross section.

Figure 4:
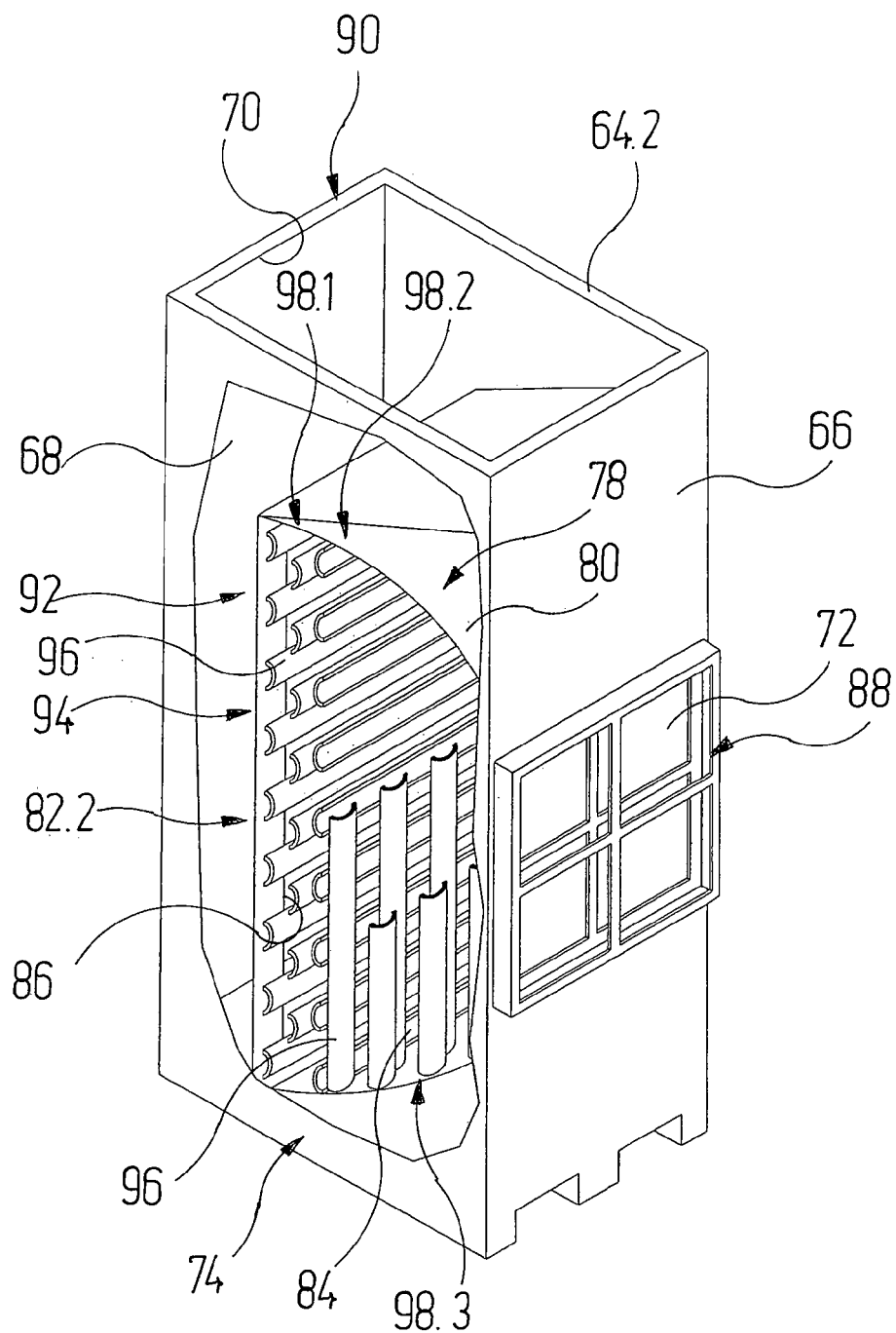
FIG. 4 shows a view in perspective of a filter module with a filter structure of a second type.

FIG. 4 shows a modified labyrinth filter module 64.2 of the set 62 with a filter unit 78 and a filter structure 82.2, which define three filter stages 98.1, 98.2 and 98.3. The filter unit 78 with the filter structure 82.2 is also designed as an inertial filter 92. The first filter stage 98.1 corresponds to the first filter stage 98.1 of the filter module 64.1 according to FIG. 3. In the second filter stage 98.2 of the filter module 64.2 is a plane with filter lamellae 96, of which the open side of the curve points in the direction of the module outlet 72. Arranged in the third filter stage 98.3 is a plurality of vertically oriented filter lamellae 96 with a curved cross section, which each extend only in the lower area of the filter unit 78 and of which the open side of the curve points towards the booth air flowing in. These vertical filter lamellae 96 are arranged in planes behind one another and offset to one another.

Such a labyrinth filter module 64.2 is basically suitable for separating all types of paint such as solvent-based paints, water-soluble paints and 2- or multicomponent paints. In particular, the vertical filter lamellae 96 present here contribute especially efficiently to the separation of flowable paints with a longer curing time, such as can be the case with 2-component paints, for example.

Figure 5:
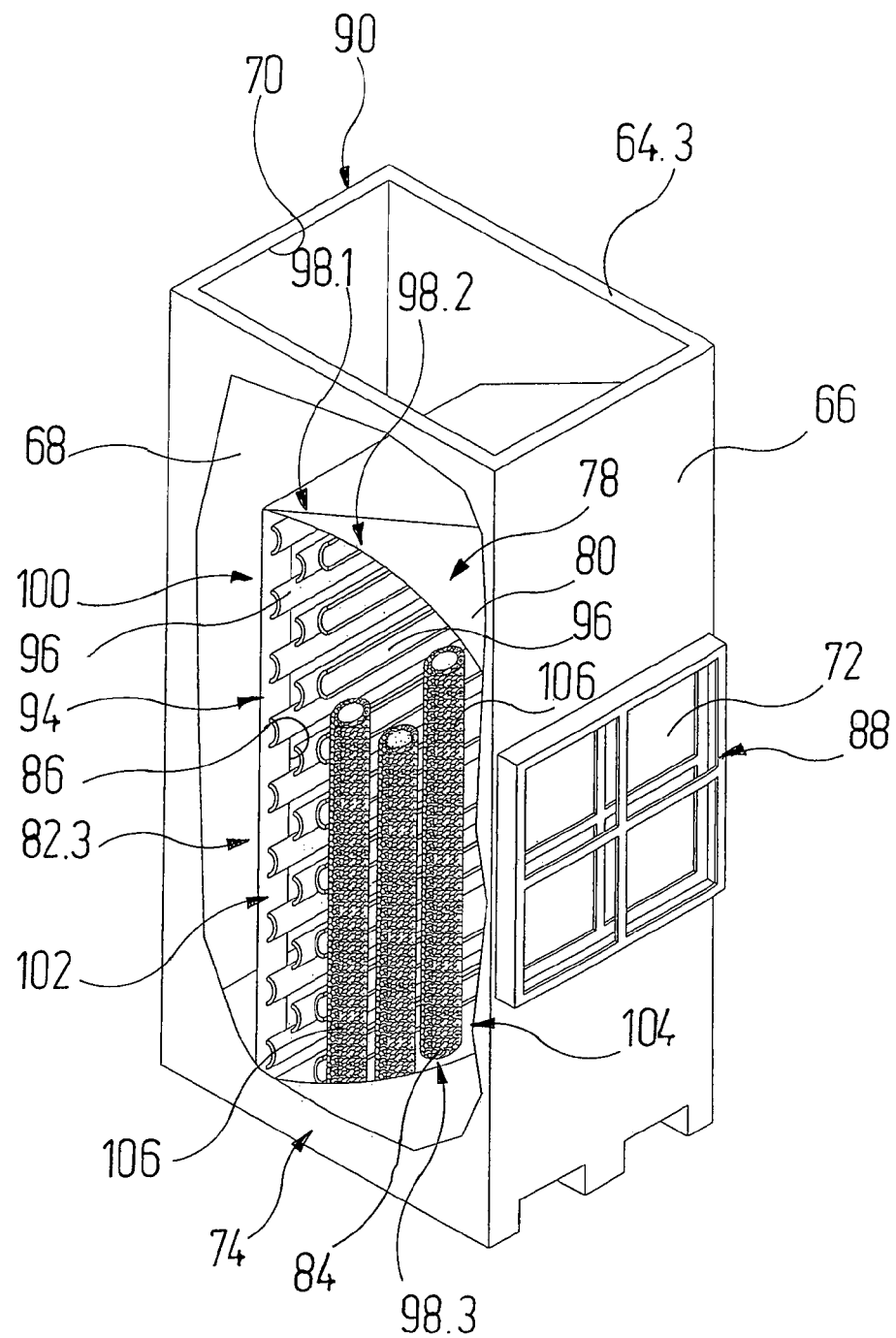
FIG. 5 shows a view in perspective of a filter module with a filter structure of a third type.

FIG. 5 shows a filter module 64.3 of the set 62 that combines the characteristics of an inertial filter with the characteristics of a separation filter. The filter unit 78 and the filter structure 82.3 there likewise define three filter stages 98.1, 98.2 and 98.3. The filter unit 78 with the filter structure 82.3 is designed as a combination filter 100 with an inertial part 102 and a separation part 104. The first filter stage 98.1 and the second filter stage 98.2 correspond to the first filter stage 98.1 and the second filter stage 98.2 of the filter module 64.2 according to FIG. 4 and form the inertial part 102. Arranged in the third filter stage 98.3 of the filter module 64.3 as filter elements 94 in the separation part 104 here is a plurality of vertically oriented filter hollow tubes 106, which can be formed of a nonwoven material, for example. Instead of the filter hollow tubes 106, filter rods 108 (cf. FIG. 6) can be provided alternatively or additionally as filter elements 94.

Such a combination filter module 64.3 is basically suitable for separating all types of paint such as solvent-based paints, water-soluble paints and 2- or multicomponent paints. Above all, such a combination filter module 64.3 can be used for quick-drying paints with small particle sizes in particular of e.g. less than 25 µm.

Figure 6:
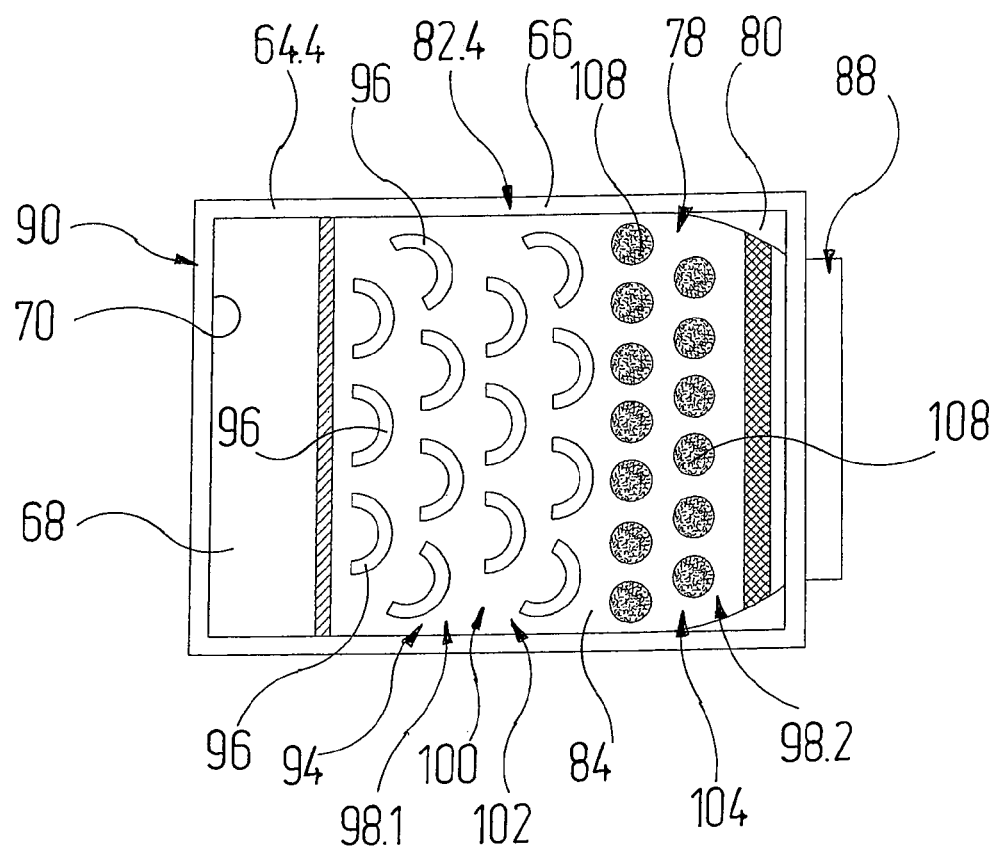
FIG. 6 shows a view from above of a filter module with a filter structure of a fourth type.

FIG. 6 shows, in a view from above, a similarly designed filter module 64.4 of the set 62 with a filter unit 78 and a filter structure 82.4, which again only define two filter stages 98.1, 98.2, however. The filter unit 78 with the filter structure 82.4 is also designed as a combination filter 100 with an inertial part 102 and a separation part 104. Provided here in the first filter stage 98.1 are filter lamellae 96 running vertically with a curved cross section, which are arranged in four planes behind one another in the flow direction and offset to one another.

The open side of the curve of the filter lamellae 96 is opposed in each case to the booth air flowing in. The filter lamellae 96 form the inertial part 102. In the second filter stage 98.2, which here forms the separation part 104 at the same time, filter rods 108 running vertically, which can be formed, for example, from a nonwoven material, are arranged as filter elements 94. Two layers of filter rods 108 are provided in the flow direction, which are arranged offset to one another. Instead of filter rods 108, filter hollow tubes 106 can be used alternatively or additionally.

A combination filter module 64.4 of this kind is basically suitable for separating all types of paint such as solvent-based paints, water-soluble paints and 2- or multicomponent paints. A combination filter 64.4 of this kind is particularly effective for clear lacquers, which can be present in turn as 2-component paints. The combination filter module 64.4 with the vertical filter lamellae 96 offers a large absorption capacity in particular.

Figure 7:
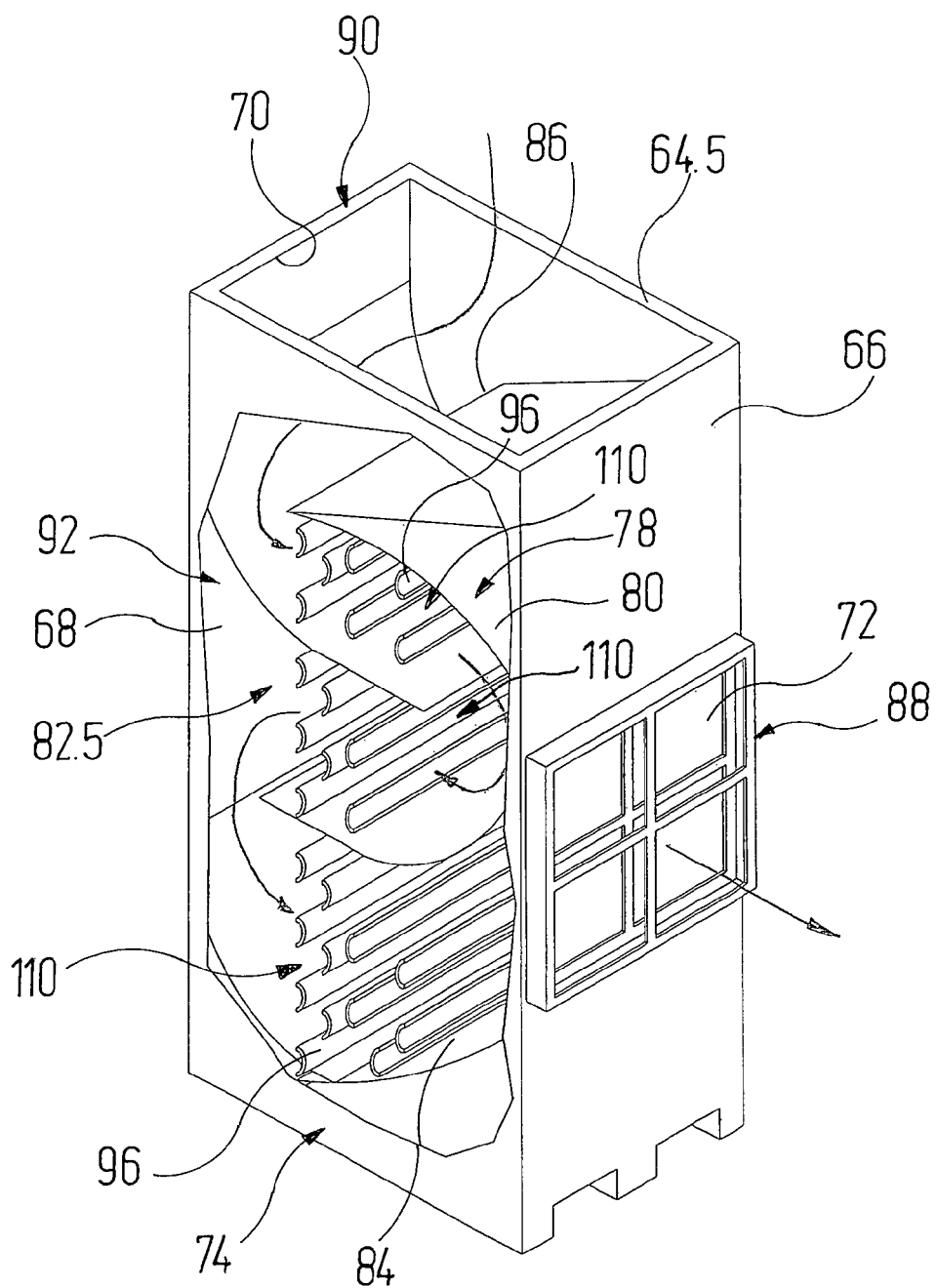
FIG. 7 shows a view in perspective of a filter module with a filter structure of a fifth type.

FIG. 7 shows a filter module 64.5 in which the booth air is carried on a meander-shaped flow path through the filter unit 78, which is illustrated by corresponding arrows. The filter module 64.5, which is likewise designed as an inertial filter 92, comprises as a filter structure 82.5 a plurality of filter lamellae 96 arranged horizontally and transversely to the flow direction of the booth air with a curved cross section, which lamellae are arranged in meander sections 110. The filter lamellae 96 are oriented in such a way that in each meander section 110 the booth air first encounters filter lamellae 96 that point with the open side of the curve towards the flow direction. Downstream of these filter lamellae 96, further lamellae 96 are arranged in each meander section 110, the open side of the curve of which lamellae points in the flow direction.

Such a meander filter module 64.5 is basically suitable for separating all types of paint such as solvent-based paints, water-soluble paints and 2- or multicomponent paints. The meander filter module 64.5 is especially effective for relatively dry paints, since a portion of the particles of such paints flows relatively far through the meander filter module 64.5 until separation takes place. The flow path in the filter module 64.5 can thus be used effectively.

Instead of the filter lamellae 96, the filter hollow tubes 106 or the filter rods 108, compartment structures or chamber structures can also be provided as filter elements 94. For example, lamellae or plates that are connected to one another collapsibly or pluggably can serve as compartment structures. Chamber structures are constructed in practice in the form of honeycombs.

FIGS. 8 and 9 show a filter module 64.6, which operates as an inertial filter 92. The filter unit 78 comprises as a filter structure 82.6 a vertical cyclone 112, in which the booth air is carried in a helical flow path. The filter unit 78 there is formed so that the booth air passes in an upward helix through the vertical cyclone 112 to a discharge channel 114, which leads to the module outlet 72.

A vertical cyclone filter module 64.6 of this kind is basically suitable for separating all types of paint such as solvent-based paints, water-soluble paints and 2- or multicomponent paints. Good drainage of the separated paint film is achieved here in particular in the take-up of 2- or multicomponent paints.

Figure 10:
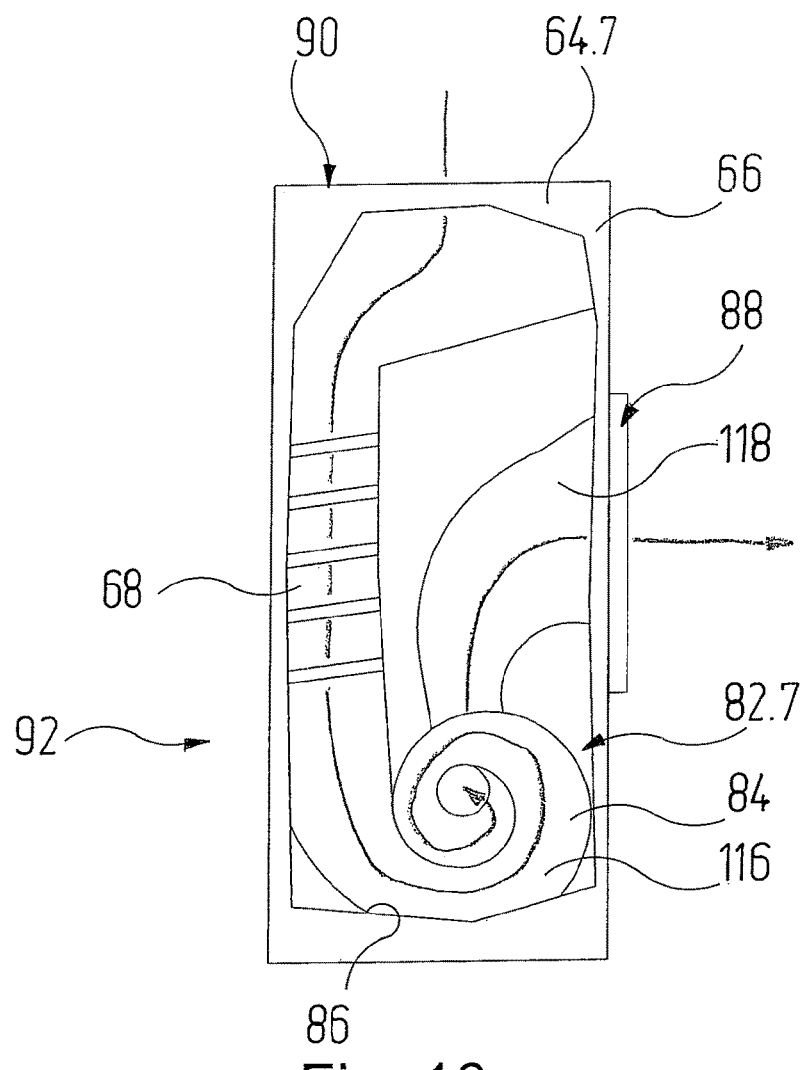
FIG. 10 shows a view in perspective of a filter module with a filter structure of a seventh type.
Figure 11:
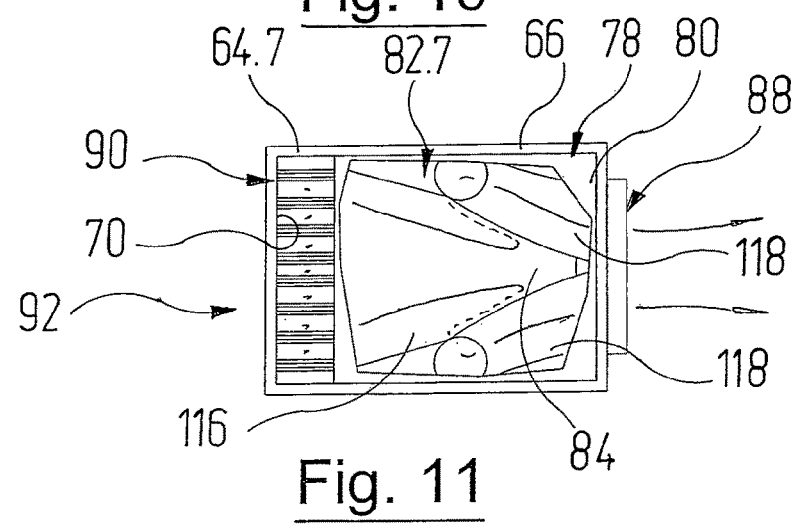
FIG. 11 shows a view from above of the filter module according to FIG. 10.

FIGS. 10 and 11 show a filter module 64.7, which likewise uses the cyclone principle as an inertial filter 92. Here the filter unit 78 comprises a horizontal cyclone 116 as a filter structure 82.7, in which the booth air is carried in a horizontal direction in a helical flow path. The horizontal cyclone 116 opens on both sides into discharge channels 118, which lead for their part in turn to the module outlet 72.

Such a horizontal cyclone filter module 64.7 is basically suitable for separating all types of paint such as solvent-based paints, water-soluble paints and 2- or multicomponent paints. Above all, solvent-based paints and water-soluble paints are separated effectively from the booth air with the aid of such a filter module 64.7.

The cyclones 112 and 116 can also be combined in a filter module 64.X with filter elements 94, which can in turn be flow-permeable or flow-impermeable for their part. The inertial filter 92 and/or the inertial part 102 of a respective filter module 64.X can generally be formed as a cyclone.

FIGS. 12 and 13 show, as an example of a separation filter, a filter module 64.8, in which the booth air flows through the filter unit 78 from bottom to top, as illustrated again by a corresponding arrow. To this end the flow intake 86 of the filter unit 78 is formed as a flow-permeable base 120 of the filter housing 80, which is located at a distance from the bottom of the module housing 66.

The filter housing 80 of the filter unit 78 is filled with a filter structure 82.8 in the form of a filter granulate 122, through which the booth air to be cleaned flows. The filter granulate 122 can also be produced from conditioned filter modules 64.X, for example. Located in front of the module outlet 72 in the filter housing 80 is a filter ceiling 124, so that any filter granulate 122 swirled up by the flowing booth air cannot escape from the filter module 64.8.

The filter module 64.8 additionally comprises a conditioning device 126. The filter medium laden with overspray, i.e. the filter granulate 122 in the present embodiment, can be treated by the conditioning device 126. The conditioning device 126 comprises in this case a reservoir 128, in which a treatment material 130 is located and which can be acted upon by compressed air via a connection 132. In this case the treatment material 130 is delivered from the reservoir 122 into the flow chamber 68 of the filter module 64.8.

The treatment material 130 can be odour inhibitors, for example, e.g. active carbon, which counteract odour development on storage of the filter modules 64.8 laden with overspray.

The treatment material 130 can be delivered into the flow chamber 68, after the filter module 64.8 has attained its limit loading with overspray and has been removed from the guiding facility 38 of the coating booth 10.

So that the treatment material 130 can be distributed well in the filter granulate 122, a further compressed air connection 134 is present, which is arranged at the bottom 120 of the filter unit 78.

Compressed air can be provided additionally in this way to the filter unit 78 and to the filter granulate 122 laden with overspray, so that this is swirled up in the filter housing 80 of the filter unit 78; this is illustrated in FIG. 13. At the same time, the treatment material 130 is driven by the compressed air out of the connection 132 through the flow chamber 68 to the filter unit 78 and into this, wherein it can moisten the walls and overspray adhering to these on the way there.

In ongoing operation of the filter module 64.8 with the filter granulate 122, it can occur that this is deposited on the filter ceiling 124 in the filter housing 80 of the filter unit 78 and so clogs up in the course of time. In this case the filter module 64.8 would have to be exchanged, although its limit loading is not yet attained.

To avoid this, the filter module 64.8 comprises a cleaning device 136, by means of which filter granulate 122 is removed from the filter ceiling 124 from time to time.

In the present embodiment, the cleaning device 136 comprises a nozzle tube 138 for this, which leads from a compressed air connection 140 to the filter ceiling 124, so that filter granulate 122 adhering to the filter ceiling 124 can be blown away.

A separation filter module 64.8 of this kind—even without conditioning device 126 and/or without cleaning device 136—is basically suitable for separating all types of paint such as solvent-based paints, water-soluble paints and 2- or multicomponent paints. Such separation filter modules 64.8 have proved especially effective for paints that still have surface activity and in particular are still tacky.

The filter modules 64.X can each be manufactured as a whole, including the respective filter unit 78, from a wet-strengthened recycled material. Expressed in general terms, one component, several components or all components of the filter modules 64.X can be produced from a wet-strengthened recycled material. Cellulose materials such as treated paper and cardboard materials if applicable, corrugated cardboard, cardboards with vertical corrugation, cardboards with a honeycomb structure or wrap cardboards, but also other materials such as e.g. MDF materials are possible for this, for example. Plastics such as polyethylene or polypropylene in particular are also possible.

The filter elements 94 and specifically the variants explained above in the form of filter lamellae 96, filter hollow tubes 106 and filter rods 108 can also be made from materials other than those just named, which for their part qualify a respective filter module 64.X in turn for a certain type of overspray with certain characteristics.

In all the filter modules 64.X explained above, in which the filter structure 82.X comprises filter elements 94, these can be produced from a separation material that is impermeable or permeable for the booth air. In the latter case, the respective filter module 64.X can operate first as a classic separation filter, but act according to the principle of an inertial filter if the filter elements are closed up by overspray.

For example, the filter elements 94 can be manufactured using fibre glass, polyesters, paper coated with plastic, polystyrene or cotton or a combination of these without this list being conclusive. The material used can be coordinated to the type and characteristics of the overspray to be cleaned.

The filter modules 64.X can themselves be supplied as a modular assembly in single parts and assembled at the location of the surface treatment installation 12. For example, the filter modules 64.X can also be designed such that they can be unfolded from a folded-up configuration. A filter module set has a volume that can be considerably smaller than the volume of the unfolded or constructed filter modules 64.X.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A method for operating a surface treatment installation comprising the steps of:
    selecting at least one one-way filter module from a set of one-way filter modules based on an overspray type requiring absorption in a coating booth where the at least one one-way filter module is to be used, wherein each one-way filter module in the set of one-way filter modules has
        a housing having an identical module inlet and an identical module outlet, and
        a filter unit, wherein the set of one-way filter modules includes at least two filter modules having different filter units;
    inserting the at least one one-way filter module in the coating booth;
    taking up and carrying overspray produced in the coating booth by an air stream to one or more one-way filter modules in which overspray is separated, wherein, once a limit loading with overspray is reached, a one-way filter module is exchanged for an empty one-way filter module, wherein
    each filter unit comprises filter structures which define a flow pathway for the overspray carried through the filter housing, wherein the at least two filter modules having different filter units have
        filter structures having a different shape, and/or
        a different follow pathway for the overspray carried through the filter housing.

2. The method according to claim 1, wherein the rheological characteristics of the overspray and/or the particle size distribution of the overspray are taken into consideration in the selection of the one-way filter module.

3. A set of filter modules for use in a surface treatment installation having a coating booth, the set of filter modules comprising:
    a) various filter modules, which are formed as exchangeable one-way units with a module housing and a filter unit having filter structures defining a flow pathway through which booth air laden with overspray can be conducted;
    and
    b) the module housings of the various filter modules have same-connection module inlets;
    c) the module housings of the various filter modules have same-connection module outlets;
    d) the filter structure and/or the flow pathway of at least two filter modules of the various filter modules are different.

4. The set of filter modules according to claim 3, wherein the set comprises at least one filter module that is formed as a separation filter.

5. The set of filter modules according to claim 3, wherein the set comprises at least one filter module that is formed as an inertial filter.

6. The set of filter modules according to claim 3, wherein the set comprises at least one filter module that is formed as a combination filter with an inertial part and a separation part.

7. The set of filter modules according to claim 5, wherein the inertial filter is formed as a cyclone.

8. The set of filter modules according to claim 3, wherein the set comprises at least one filter module with a plurality of filter elements, which are arranged in such a way that a flow labyrinth is formed between the filter elements.

9. The set of filter modules according to claim 8, wherein the set comprises at least one filter module, in which filter lamellae, filter hollow tubes, filter rods, compartment structures or chamber structures are present as filter elements.

10. The set of filter modules according to claim 9, wherein the filter elements are formed as filter lamellae with a curved or V-shaped cross section.

11. The set of filter modules according to claim 3, wherein the set comprises at least one filter module in which a plurality of filter stages is present, which follow one another in the flow direction of the booth air.

12. An installation for the surface treatment of objects, comprising:
    a) a coating booth, through which an air stream can be conducted that takes up any overspray produced and carries it away;
    b) a separation device, to which this air stream can be supplied and where a majority of at least solids in the overspray are separated from the overspray, wherein
        the separation device including a set of filter modules according to claim 3.

13. The set of filter modules according to claim 6, wherein the inertial part of a respective filter module is formed as a cyclone.

* * * * *